United States Patent
Hodge et al.

(10) Patent No.: US 12,321,087 B2
(45) Date of Patent: Jun. 3, 2025

(54) CAMERA MIRROR SYSTEM WITH OUTSIDE AIR TEMPERATURE SENSOR

(71) Applicant: Stoneridge Electronics AB, Solna (SE)

(72) Inventors: Nathan Hodge, Brighton, MI (US); Jacob Biederman, Bucyrus, OH (US); Susan Kolinski, Walled Lake, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 94 days.

(21) Appl. No.: 17/792,846

(22) PCT Filed: Dec. 16, 2021

(86) PCT No.: PCT/US2021/063859
§ 371 (c)(1),
(2) Date: Jul. 14, 2022

(87) PCT Pub. No.: WO2022/140161
PCT Pub. Date: Jun. 30, 2022

(65) Prior Publication Data
US 2023/0011832 A1 Jan. 12, 2023

Related U.S. Application Data

(60) Provisional application No. 63/130,041, filed on Dec. 23, 2020.

(51) Int. Cl.
*G03B 17/56* (2021.01)
*B60R 1/12* (2006.01)
*B60R 1/25* (2022.01)

(52) U.S. Cl.
CPC .............. *G03B 17/561* (2013.01); *B60R 1/12* (2013.01); *B60R 1/25* (2022.01);
(Continued)

(58) Field of Classification Search
None
See application file for complete search history.

(56) References Cited

U.S. PATENT DOCUMENTS 6,116,743 A * 9/2000 Hoek ...................... B60R 1/078
359/872
6,814,476 B2 * 11/2004 Assinder .............. B60Q 1/2665
362/501
(Continued)

FOREIGN PATENT DOCUMENTS

DE 3314515 A1 10/1984
WO 20200232241 A1 11/2020

OTHER PUBLICATIONS

International Search Report and Written Opinion for International Application No. PCT/US2021/063859 mailed 3 Mar. 1, 2022.
(Continued)

*Primary Examiner* — Rodney E Fuller
(74) *Attorney, Agent, or Firm* — Carlson, Gaskey & Olds, P.C.

(57) ABSTRACT

A camera arm for vehicle camera mirror system includes, among other things, a fixed housing portion that has a mounting bracket configured to secure the camera arm to a vehicle, a pivotable housing portion that is rotatably supported on the fixed housing portion by a pivot assembly, a camera that is arranged within the pivotable housing portion and configured to capture a view in relation to the vehicle, and a temperature sensor that is arranged within the fixed housing portion and configured to detect an temperature exterior to the vehicle.

11 Claims, 4 Drawing Sheets

(52) U.S. Cl.
CPC .. *B60R 2001/1223* (2013.01); *B60R 2300/105* (2013.01); *B60R 2300/20* (2013.01)

(56) References Cited

U.S. PATENT DOCUMENTS

| | | | | |
|---|---|---|---|---|
| 10,077,000 | B2* | 9/2018 | Fuji | B60R 1/074 |
| 2014/0036081 | A1 | 2/2014 | Lang et al. | |
| 2018/0056871 | A1* | 3/2018 | Karner | H04N 7/181 |
| 2020/0267820 | A1* | 8/2020 | van den Brink | H04N 23/56 |
| 2020/0290514 | A1* | 9/2020 | Takenaka | B60R 1/26 |
| 2020/0401818 | A1* | 12/2020 | Gibert Castroverde | B60R 1/00 |
| 2021/0129753 | A1* | 5/2021 | Hendricks | H04N 23/695 |
| 2021/0339685 | A1* | 11/2021 | Adams | H04N 23/57 |

OTHER PUBLICATIONS

International Preliminary Report on Patentability for International Application No. PCT/US2021/063859 mailed Jul. 6, 2023.
1 Office Action for European Application No. 21836738.1 mailed Jun. 19, 2024.

\* cited by examiner

CAMERA MIRROR SYSTEM WITH OUTSIDE AIR TEMPERATURE SENSOR

CROSS-REFERENCE TO RELATED APPLICATION

This application claims priority to U.S. Provisional Application No. 63/130,041 filed on Dec. 23, 2020.

TECHNICAL FIELD

This disclosure relates to an outside air temperature sensor for use with a camera mirror system camera arm.

Ambient air temperature measured by vehicles for a variety of purposes, including climate control, driver information and engine operation. The temperature sensor is often located at the front of the vehicle between the grill and the radiator. Some passenger vehicles have located the outdoor air temperature sensor in the folding portion of the vehicle sideview mirror. The temperature sensor may protrude from the bottom of the housing of the folding portion that is used to house the sideview mirror.

SUMMARY

In one exemplary embodiment, a camera arm for vehicle camera mirror system includes, among other things, a fixed housing portion that has a mounting bracket configured to secure the camera arm to a vehicle, a pivotable housing portion that is rotatably supported on the fixed housing portion by a pivot assembly, a camera that is arranged within the pivotable housing portion and configured to capture a view in relation to the vehicle, and a temperature sensor that is arranged within the fixed housing portion and configured to detect an temperature exterior to the vehicle.

In a further embodiment of any of the above, the mounting bracket provides a mounting surface, and the pivotable housing portion provides a terminal end of the camera arm opposite the mounting surface. The camera arm extends a distance from the mounting surface to the terminal end. The temperature sensor is located with one third of the distance from the mounting surface.

In a further embodiment of any of the above, the pivot assembly includes a power folding actuator.

In a further embodiment of any of the above, the view is at least one of a Class II, Class IV, Class V and/or Class VI view.

In a further embodiment of any of the above, the temperature sensor is a thermocouple.

In a further embodiment of any of the above, the pivotable housing portion is without a mirror.

In another exemplary embodiment, a camera mirror system includes, among other things, the camera arm, first and second exterior cameras that are configured to provide captured images outside of the vehicle that correspond to legally prescribed views. The camera is provided by one of the first and second exterior cameras. The camera mirror system further includes first and second displays that are configured to be arranged within a vehicle and configured to depict the captured images respectively from the first and second exterior cameras.

In a further embodiment of any of the above, the camera mirror system includes a wiring harness that provides communications between the camera arm and at least one of the first and second displays. The temperature sensor is connected to a vehicle electronics system by the wiring harness.

In a further embodiment of any of the above, the vehicle electronics system includes a driver information system that is arranged near a steering wheel. The first and second displays are respectively arranged at driver and passenger side A-pillars.

In another exemplary embodiment, a vehicle including the camera arm of includes, among other things, a vehicle cab that has a cabin and doors that are configured for occupant egress and ingress relative to the cabin. The doors have windows that provide a beltline, and a windshield is supported on opposing lateral sides by spaced apart A-pillars that are joined to a roof above the windshield. The camera arm is mounted to the vehicle within one foot of at least one of the A-pillar and the roof.

In a further embodiment of any of the above, the vehicle includes an engine that is configured to provide vehicle propulsion. The cabin is arranged above the engine.

In a further embodiment of any of the above, the camera arms is mounted within one foot of the roof.

In a further embodiment of any of the above, the mounting bracket provides a mounting surface, and the pivotable housing portion provides a terminal end of the camera arm opposite the mounting surface. The camera arm extends a distance from the mounting surface to the terminal end. The temperature sensor is located with one third of the distance from the mounting surface.

In a further embodiment of any of the above, the pivotable housing portion is without a mirror.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
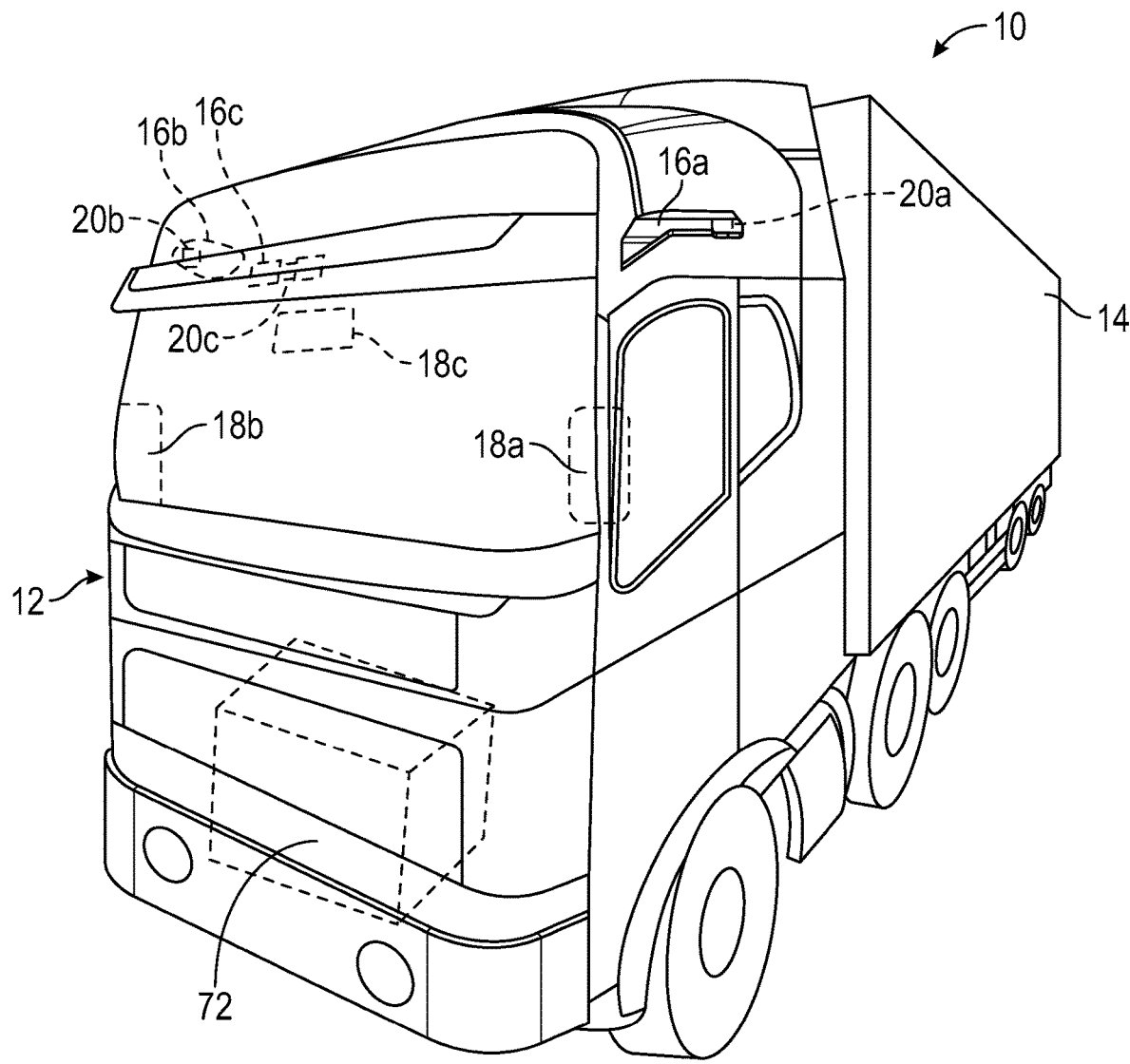
FIG. 1A is a schematic front view of a commercial truck with a camera mirror system (CMS) used to provide at least Class II and Class IV views.
Figure 1B:
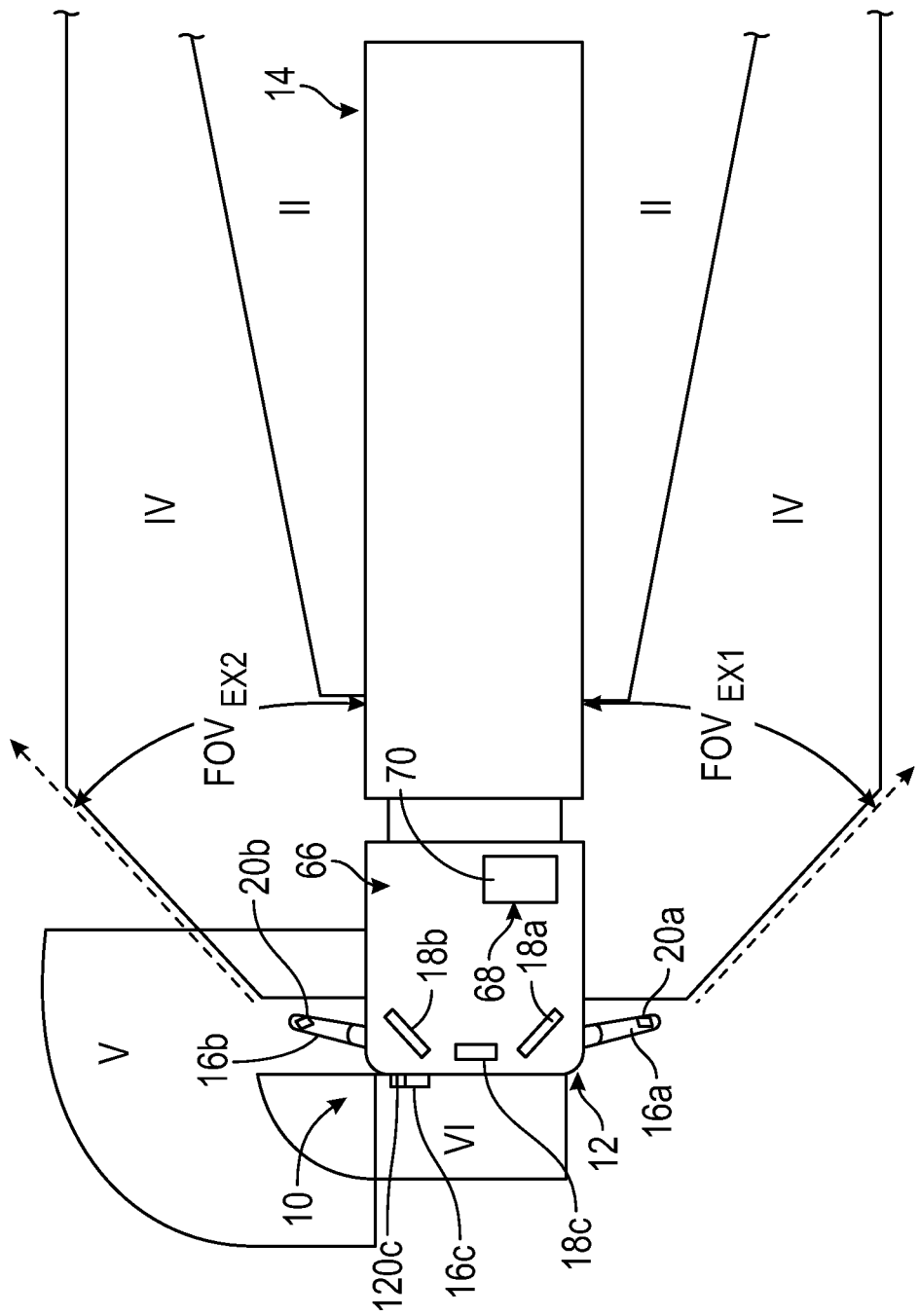
FIG. 1B is a schematic top elevational view of the commercial truck of FIG. 1B with a camera mirror system providing Class II, Class IV, Class V and Class VI views.
Figure 4:
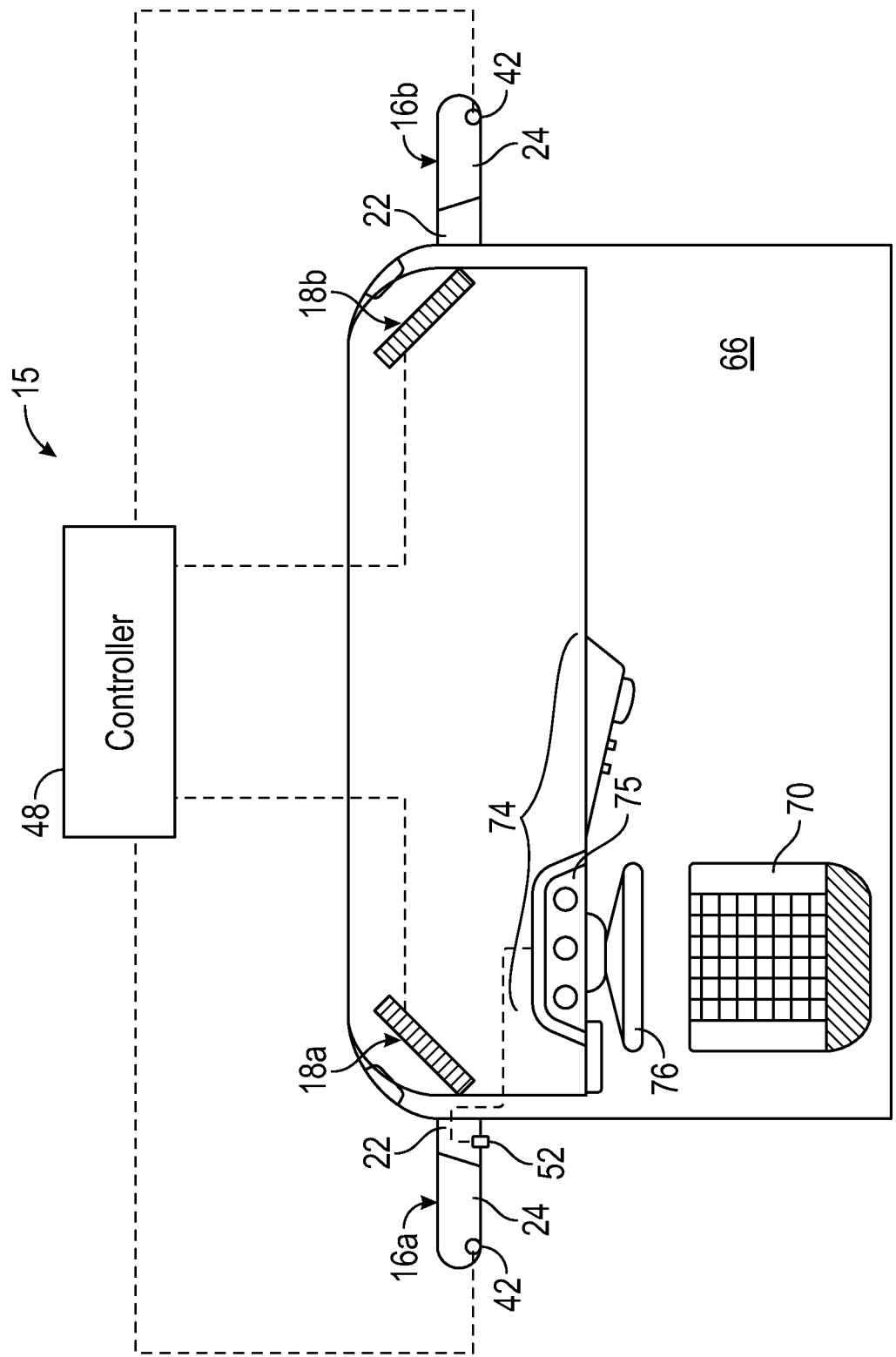
FIG. 4 is a schematic top perspective view of a cabin shown in FIGS. 1B and 3 including displays.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied other types of vehicles. However, the location of the disclosed outdoor air temperature sensor contemplates the aerodynamic challenges present in commercial vehicles. The vehicle 10 incorporates a camera mirror system (CMS) 15 (FIGS. 2 and 4) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors such that the camera arms are entirely without any mirrors. A camera arm without a mirror has different aerodynamics than one with a large mirror.

Each of the camera arms 16a, 16b includes a base (e.g., fixed housing portion 22, FIG. 2) that is secured to, for example, the vehicle cab 12. A pivoting arm (e.g., pivotable housing portion 24, FIG. 2) is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Each arm may also provide a housing that encloses electronics that are configured to provide various features of the CMS 15.

First and second video displays 18a, 18b are arranged on each of the driver and passenger sides within the vehicle cab 12 on or near the A-pillars to display Class II and Class IV views on its respective side of the vehicle 10, which provide rear facing side views along the vehicle 10 that are captured by the exterior cameras 20a, 20b.

Figure 3:
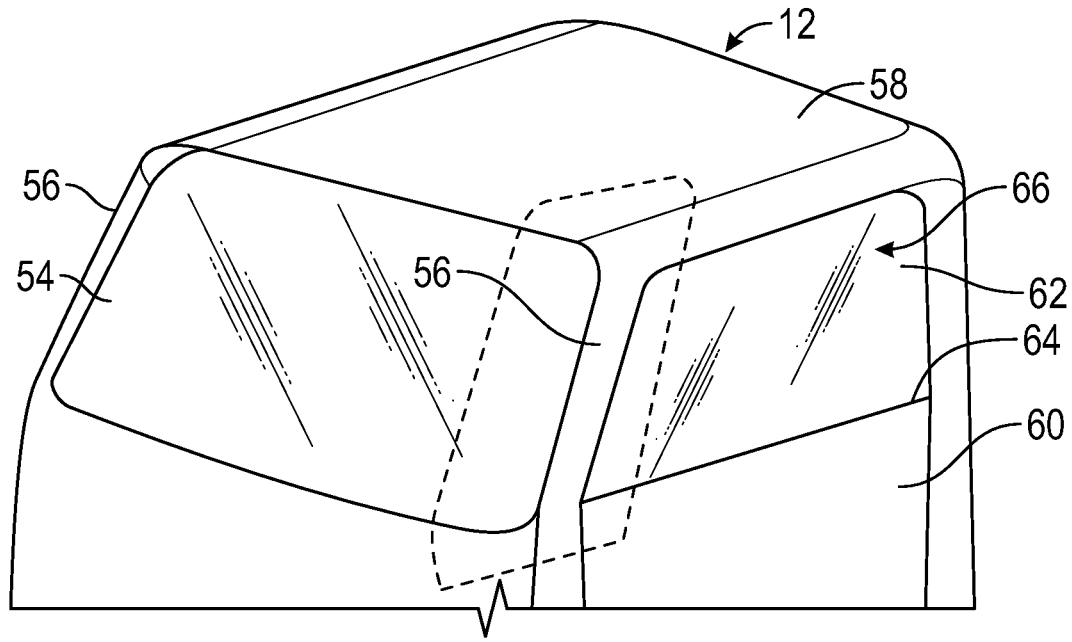
FIG. 3 is an enlarged partial perspective view of a tractor/vehicle cab shown in FIG. 1A.

If video of Class V and Class VI views are also desired, a camera housing 16c and camera 20c may be arranged at or near the front of the vehicle 10 to provide those views (FIG. 1B). A third display 18c arranged within the vehicle cab 12 near the top center of the windshield (54 in FIG. 3) can be used to display the Class V and Class VI views, which are toward the front of the vehicle 10, to the driver. It should be understood that the cameras and displays can be configured differently than described.

The vehicle cab 12 illustrated is a "cab over" design in which the vehicle's cabin 66 (FIG. 3) is arranged on top of an engine 72 (FIG. 1A) used for vehicle propulsion. This results in a relative flat frontal area, which affects the flow characteristics around the vehicle 10 and the camera arms 16a, 16b. Whether the vehicle cab 12 is a cab over design, as typically used outside of the United States or a design in which the engine is in front of the windshield, tractors have relatively poor aerodynamics as compared to passenger vehicles and trucks. As such, the airflow around the camera arms 16a, 16b may be substantially different from passenger vehicle applications.

Figure 2:
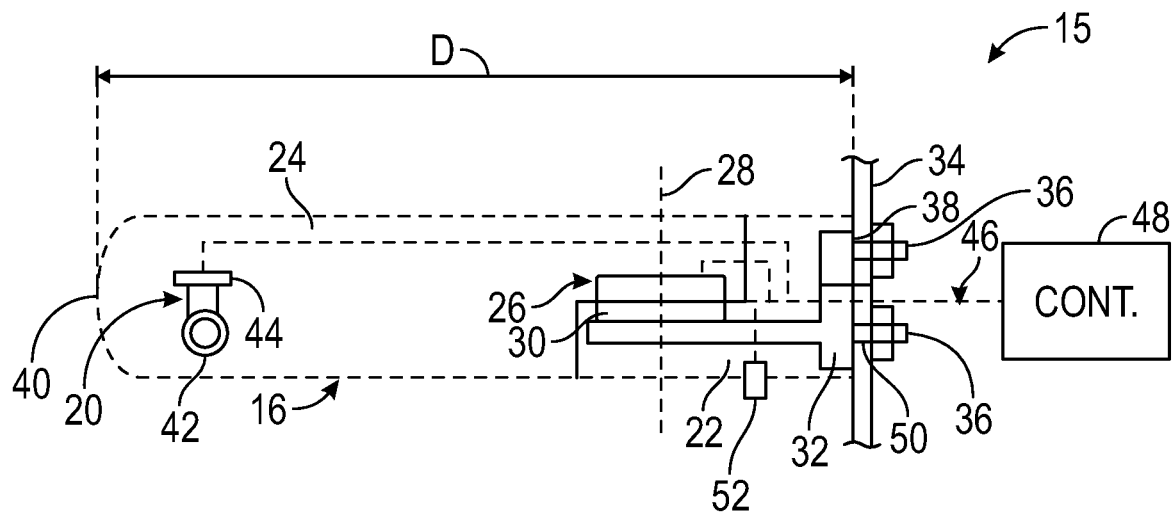
FIG. 2 is a schematic view of a camera arm for a camera mirror system.

Referring to FIG. 2, an exemplary camera arm 16 is shown. The camera arm 16 includes a fixed housing portion 22 having a mounting bracket 32 used to secure the camera arm 16 to a vehicle body structure 34, such as an A-pillar 56, door 60 or roof 58 (see, FIG. 3), using fasteners 36. A pivotable housing portion 24 is rotatably supported on the fixed housing portion 22 by a pivot assembly 26, which enables the pivotable housing portion 24 to rotate about an axis 28. The pivot assembly 26 may provide a manual folding option and/or the may include an actuator 30 to provide power folding of the pivotable housing portion 24 in response to an input, such as a switch.

The camera 20 used in the CMS 15 is arranged within the pivotable housing portion 24 and is configured to capture at least one of the legally prescribed views in relation to the vehicle on an image capture unit 44. A lens 42 of the camera 20 is exposed through an opening in the pivotable housing portion 24 and is aft-facing to capture the Class II and/or Class IV views. In the example shown, the camera arm 16 is for a mirror replacement system such that there is no conventional sideview mirrors and the pivotable housing portion 24 does not have a mirror. This generally results in an aerodynamic camera arm design.

In one example, an outside ambient air temperature sensor 52 is arranged within the fixed housing portion 22 and is configured to detect an ambient air temperature exterior to the vehicle cab 12. The temperature sensor 52 may extend from the camera housing into the environment to have direct exposure to the airflow around the camera arm 16. In one example, the temperature sensor 52 is a thermocouple.

A wiring harness 46 provides communications between the camera arm 16 and at least one of the first and second displays 18a, 18b via a controller 48. The controller 48 may be provided by one or more processors or memory that may be arranged on a common circuit board or separate circuit boards that may be near or remote relative to one another. The temperature sensor 52 is connected to a vehicle electronics system 74 by the wiring harness 46. The wiring harness 46 may be provided by bundles of wires or single wires that pass through an aperture 50 in the mounting bracket 32, for example. The vehicle electronics system 74 includes a driver information system (DIS) 75 arranged near a steering wheel 76 in a driver area 68 (FIG. 1B) to display features like a speedometer, odometer and other driver information to a driver situated in the driver's seat 70. The DIS 75 may also display the exterior air temperature from the temperature sensor 52.

The mounting bracket 32 provides a mounting surface 38, and the pivotable housing portion 24 provides a terminal end 40 of the camera arm 16 opposite the mounting surface 38. The camera arm 16 extends a distance D from the mounting surface 38 to the terminal end 40. The temperature sensor 52 is located within one third of the distance D from the mounting surface 38, which may or may not be in the fixed housing portion 22, in order to position the temperature sensor 52 is a region of desirable airflow characteristics throughout a wide range of vehicle speeds for the commercial truck. In one example, the temperature sensor 52 is arranged in the fixed housing portion 22, which is sufficiently inboard from the terminal end 40 and excessively turbulent airflow, which being sufficiently far from the thermal effects of the body structure.

The positioning of the camera arm 16 itself also affects the airflow about the temperature sensor 52. In a CMS 15 it might be desirable to have the camera arm 16 positioned relatively high on the vehicle cab 12 to provide the desired views. Referring FIG. 3, the camera arm 16 may be positioned in the dashed region for improved visibility in some applications. The side doors 60 used for occupant egress and ingress have windows 62 that provide a beltline 64 where the window glass meets the door shell. The windshield 54 is supported on opposing lateral sides by spaced apart A-pillars 56 and joined to roof, as is conventional. The camera arm 16 is mounted to the vehicle 10 within one foot of at least one of the A-pillar 56 and the roof 58, for example. In one example, the camera arm 16 is mounted within one foot of the roof 58.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A camera system, comprising:
a camera arm including a fixed housing portion having a mounting bracket configured to secure the camera arm to a vehicle, the mounting bracket provides a mounting surface, and the camera arm has a terminal end opposite the mounting surface, the camera arm extends a distance from the mounting surface to the terminal end;
a camera arranged within the camera arm and configured to capture a view in relation to the vehicle, wherein the camera arm is without a mirror; and
a temperature sensor arranged in the camera arm within one third of the distance from the mounting surface, the temperature sensor configured to detect a temperature exterior to the vehicle.

2. The camera system of claim 1, comprising a pivotable housing portion rotatably supported on the fixed housing portion by a pivot assembly, the pivotable housing portion provides the terminal end, and wherein the pivot assembly includes a power folding actuator.

3. The camera system of claim 1, wherein the view is at least one of a Class II, Class IV, Class V and/or Class VI view.

4. The camera system of claim 1, wherein the temperature sensor is a thermocouple.

5. The camera system of claim 1, comprising:
first and second exterior cameras configured to provide captured images outside of the vehicle corresponding to legally prescribed views, wherein the camera is provided by one of the first and second exterior cameras; and
first and second displays configured to be arranged within a vehicle and configured to depict the captured images respectively from the first and second exterior cameras.

6. The camera system of claim 5, comprising a wiring harness providing communications between the camera arm and at least one of the first and second displays, the temperature sensor connected to a vehicle electronics system by the wiring harness.

7. The camera system of 6, wherein the vehicle electronics system includes a driver information system arranged near a steering wheel, and the first and second displays are respective arranged at driver and passenger side A-pillars.

8. A vehicle including the camera system of claim 1, comprising:
a vehicle cab having a cabin and doors configured for occupant egress and ingress relative to the cabin, the doors having windows that provide a beltline, and a windshield is supported on opposing lateral sides by spaced apart A-pillars joined to a roof above the windshield;
wherein the camera arm is mounted to the vehicle within one foot of at least one of the A-pillar and the roof.

9. The vehicle of claim 8, comprising an engine configured to provide vehicle propulsion, the cabin arranged above the engine.

10. The vehicle of claim 8, wherein the camera arm is mounted within one foot of the roof.

11. A camera arm for vehicle camera mirror system, comprising:
a fixed housing portion having a mounting bracket configured to secure the camera arm to a vehicle, wherein the camera arm is without a mirror, wherein the mounting bracket provides a mounting surface;
a pivotable housing portion rotatably supported on the fixed housing portion by a pivot assembly, the pivotable housing portion provides a terminal end of the camera arm opposite the mounting surface, the camera arm extends a distance from the mounting surface to the terminal end;
a camera arranged within the pivotable housing portion and configured to capture a view in relation to the vehicle; and
a temperature sensor located within one third of the distance from the mounting surface and configured to detect a temperature exterior to the vehicle.

* * * * *